(12) United States Patent
Li

(10) Patent No.: US 10,595,378 B2
(45) Date of Patent: Mar. 17, 2020

(54) LIGHT DEVICE DRIVING SYSTEM

(71) Applicant: LEEDARSON AMERICA INC., Smyrna, GA (US)

(72) Inventor: Yongchuan Li, Smyrna, GA (US)

(73) Assignee: LEEDARSON AMERICA INC., Smyrna, GA (US)

( * ) Notice: Subject to any disclaimer, the term of this patent is extended or adjusted under 35 U.S.C. 154(b) by 0 days.

(21) Appl. No.: 16/234,642

(22) Filed: Dec. 28, 2018

(65) Prior Publication Data
US 2019/0239312 A1 Aug. 1, 2019

Related U.S. Application Data

(60) Provisional application No. 62/622,950, filed on Jan. 28, 2018.

(51) Int. Cl.
*H05B 37/02* (2006.01)
*H02M 7/06* (2006.01)
*H02M 1/44* (2007.01)
*H05B 33/08* (2006.01)
*H02M 1/00* (2006.01)

(52) U.S. Cl.
CPC .......... *H05B 37/0209* (2013.01); *H02M 1/44* (2013.01); *H02M 7/06* (2013.01); *H05B 33/0845* (2013.01); *H02M 2001/0009* (2013.01)

(58) Field of Classification Search
CPC . H05B 37/0209; H05B 33/0815; H02M 7/06; H02M 1/44; H02M 1/0009
See application file for complete search history.

(56) References Cited

U.S. PATENT DOCUMENTS

| 2012/0176048 | A1* | 7/2012 | Li | H05B 33/0815 315/186 |
| 2014/0265935 | A1* | 9/2014 | Sadwick | H05B 33/0815 315/307 |
| 2014/0354170 | A1* | 12/2014 | Gredler | H05B 33/0815 315/224 |
| 2016/0198537 | A1* | 7/2016 | Bannister | H05B 33/0815 315/200 R |
| 2019/0029086 | A1* | 1/2019 | Wang | G06F 1/263 |

* cited by examiner

*Primary Examiner* — Raymond R Chai
(74) *Attorney, Agent, or Firm* — Chun-Ming Shih; Lanway IPR Services

(57) ABSTRACT

A light device driving system includes a voltage source managing module, a duty cycle adjusting module, a control integrated circuit, a power outputting module, a passive lighting device and a voltage/current output control module. The voltage source managing module generates an input voltage. The duty cycle adjusting module adjusts a duty cycle of a phase-width modulation signal of the light device driving system according to a voltage feedback signal. The control integrated circuit generates the phase-width modulation signal based on the adjusted duty cycle. The voltage/current output control module generates the voltage feedback signal according to the output voltage and a voltage dimming signal and configured to forward the voltage feedback signal to the duty cycle adjusting module.

17 Claims, 9 Drawing Sheets

LIGHT DEVICE DRIVING SYSTEM

CROSS REFERENCE

This application claims the benefit of U.S. Provisional Application No. 62/622,950, filed on Jan. 28, 2018 the contents of which are incorporated herein by reference.

FIELD OF THE INVENTION

The present invention relates to a light device driving system, and particularly relates to a light device driving system capable of adjusting its PWM signal according to its instant output voltage.

BACKGROUND

Conventionally, the lighting level for light devices can be controlled by dimmers. However, if operating voltages of the dimmers are set to low values, a starting time of such light devices may be too long. On top of that, such low operating voltages may render the light devices be directly turned off in an undesired manner, even when the operating voltages are normally and continuously provided.

SUMMARY OF THE INVENTION

One objective of the present invention is to provide a light device driving system having dimmers capable of dynamically adjusting duty cycles of PWM signals.

According to one embodiment of the present invention, a light device driving system includes a voltage source managing module, a duty cycle adjusting module, a control integrated circuit, a power outputting module, a passive lighting device and a voltage/current output control module. The voltage source managing module is configured to generate an input voltage. The duty cycle adjusting module is configured to adjust a duty cycle of a phase-width modulation signal of the light device driving system according to a voltage feedback signal. The control integrated circuit is configured to generate the phase-width modulation signal based on the adjusted duty cycle. The power outputting module is configured to generate an output voltage by modulating the input voltage using the adjusted duty cycle. The passive lighting device, configured to illuminate using the output voltage. The voltage/current output control module is configured to generate the voltage feedback signal according to the output voltage and a voltage dimming signal and configured to forward the voltage feedback signal to the duty cycle adjusting module.

In one example, the light device driving system further includes a current sampling module. The current sampling module is configured to sample the output voltage and forward a result of sampling the output voltage to the voltage/current output control module.

In one example, the current sampling module includes a first resistor and a second resistor. The first resistor has a first side and a second side coupled to the passive lighting device for sampling the output voltage. The second resistor is coupled to the first resistor in parallel. The second resistor has a third side coupled to the voltage/current output control module for forwarding the result of sampling the output voltage.

In one example, the light device driving system further includes a voltage dimmer and a threshold setting module. The voltage dimmer is configured to generate the voltage dimming signal. The threshold setting module is configured to limit a voltage level of the voltage dimming signal between an upper threshold voltage and a lower threshold voltage.

In one example, the voltage dimmer includes a first bipolar transistor, a second bipolar transistor, a first diode, a comparator and a second diode. The first bipolar transistor has a base terminal coupled to ground and a collector terminal coupled to a positive terminal of a standard dimmer voltage source. The second bipolar transistor has a base terminal coupled to a transmitter terminal of the first bipolar transistor, a collector terminal coupled to the base terminal of the first bipolar transistor, and a transmitter terminal coupled to the base terminal of the second bipolar transistor and an upper threshold voltage. The first diode has a negative side coupled to a standard dimmer voltage source and having a positive side coupled to ground. The comparator has an upper threshold terminal coupled to the upper threshold voltage, a lower threshold terminal coupled to ground, a positive input terminal coupled to the negative terminal of the first diode, a negative input side coupled to the positive terminal of the first diode and a lower threshold voltage, and an output side coupled to the negative input terminal of the comparator. The second diode has a negative terminal coupled to the negative input terminal of the comparator and a positive terminal coupled to ground. The threshold setting module includes a first resistor and a second resistor. The first resistor has a first side coupled to the upper threshold voltage and a second side coupled to the lower threshold voltage. The second resistor has a first side coupled to the second side of the first resistor and a second side coupled to the negative side of the second diode.

In one example, the voltage dimmer further includes a third resistor, a fourth resistor, a fifth resistor, a sixth resistor, a seventh resistor, an eighth resistor, a ninth resistor, a tenth resistor, an eleventh resistor, a twelfth resistor, a thirteenth resistor, a fourteenth resistor, a first capacitor and a second capacitor. The third resistor has a first terminal coupled to ground and a second terminal coupled to the base terminal of the first bipolar transistor. The fourth resistor has a first terminal coupled to the base terminal of the second bipolar transistor and a second terminal coupled to the emitter terminal of the second bipolar transistor. The fifth resistor is coupled to the first diode in parallel. The sixth resistor has a first terminal coupled to the upper threshold voltage. The seventh resistor has a first terminal coupled to a second terminal of the sixth resistor and a second terminal coupled to the positive terminal of the first diode. The eighth resistor has a first terminal coupled to the second terminal of the sixth resistor and a second terminal coupled to the negative terminal of the second diode. The ninth resistor has a first terminal coupled to the output terminal of the comparator and a second terminal coupled to the negative terminal of the second diode. The tenth resistor has a first terminal coupled to the negative input terminal of the comparator and the output terminal of the comparator. The eleventh resistor has a first terminal coupled to the negative terminal of the second diode. The twelfth resistor has a first terminal coupled to a second terminal of the eleventh resistor and a second terminal coupled to the positive terminal of the second diode. The thirteenth resistor has a first terminal coupled to the standard dimmer voltage source and a second terminal coupled to the collector terminal of the first bipolar transistor. The fourteenth resistor has a first terminal coupled to the collector terminal of the first bipolar transistor and a second terminal coupled to the positive input terminal of the comparator. The first capacitor is coupled to the first diode in parallel. The second capacitor has a first terminal coupled to the negative input terminal of the comparator and a second terminal coupled to the output terminal of the comparator. The threshold setting module further includes a fifteenth resistor, a sixteenth resistor, a third capacitor and a fourth capacitor. The fifteenth resistor has a first terminal coupled to the lower threshold voltage and a second terminal coupled to the second terminal of the first resistor. The sixteenth resistor has a first terminal coupled to the second terminal of the first resistor and a second terminal coupled to ground. The third capacitor has a first terminal coupled to the upper threshold voltage and a second terminal coupled to the first terminal of the first resistor. The fourth capacitor is coupled to the sixteenth resistor in parallel.

In one example, the light device driving system further includes a signal feedback module. The signal feedback module is configured to forward the voltage feedback signal from the voltage/current output control signal module to the duty cycle adjusting module by photo-coupling.

In one example, the signal feedback module includes a photo coupler and a resistor. The photo coupler has a first side and a second side coupled to the voltage/current output control module. The photo coupler also has a third side and a fourth side coupled to the duty cycle adjusting module, for passing the voltage feedback signal from the voltage/current output control module to the duty cycle adjusting module by photo-coupling. The resistor is coupled to the photo coupler in parallel.

In one example, the voltage source managing module includes an electromagnetic interference (EMI) module, a rectifier module and a filter module. The electromagnetic interference (EMI) module is configured to protecting the input voltage from being affected by external electromagnetic interference. The rectifier module is configured to transform a current property of the input voltage. The filter module is configured to filter off noises within the input voltage.

In one example, the EMI module comprises a first variable resistor, a first inductor, a first capacitor, a second capacitor, a second variable resistor and a second inductor. The first variable resistor is coupled to an input voltage source in parallel. The first inductor has a first input terminal coupled to a first terminal of the first variable resistor and a second input terminal coupled to a second terminal of the first variable resistor. The first capacitor has a first terminal coupled to ground and a second terminal coupled to a first output terminal of the first inductor. The second capacitor has a first terminal coupled to ground and a second terminal coupled to a second output terminal of the first inductor. The second variable resistor is coupled to the first inductor in parallel. The second inductor has a first input terminal coupled to a first terminal of the second variable resistor and a second input terminal coupled to a second terminal of the second variable resistor. The rectifier module includes a full bridge rectifier that has a first terminal coupled to a first output terminal of the second inductor, a second terminal coupled to a second output terminal of the second inductor, and a third terminal coupled to ground. The filter module includes a first resistor, a third capacitor, a fourth capacitor and a third inductor. The first resistor has a first terminal coupled to a fourth terminal of the full bridge rectifier. The third capacitor has a first terminal coupled to the first terminal of the first resistor and a second terminal coupled to the third terminal of the full bridge rectifier. The fourth capacitor is coupled to the third capacitor in parallel. The third inductor is coupled to the first resistor in parallel.

In one example, the EMI module further includes a fifth capacitor, a second resistor and a third resistor. The fifth capacitor has a first terminal coupled to the second terminal of the first capacitor and a second terminal coupled to the second terminal of the second capacitor. The second resistor has a first terminal coupled to the first terminal of the fifth capacitor. The third resistor has a first terminal coupled to a second terminal of the second resistor and a second terminal coupled to the second terminal of the fifth capacitor.

In one example, the power outputting module includes a transformer module, a rectifier module and a filter module. The transformer module is configured to transform a voltage level of the output voltage. The rectifier module is configured to transform a current property of the output voltage. The filter module is configured to filter off noises within the output voltage. The transformer module includes a first inductor, a p-type metal-oxide-semiconductor field-effect transistor (p-type MOSFET), a bipolar transistor and a first diode. The p-type metal-oxide-semiconductor field-effect transistor (p-type MOSFET) has a gate and a drain both coupled to ground and having a source coupled to a first input terminal of the first inductor. The bipolar transistor has a drain coupled to a second input terminal of the first inductor and a collector coupled to the duty cycle adjusting module. The first diode has a positive terminal coupled to the first input terminal of the first inductor and a negative terminal coupled to a gate and the drain of the bipolar transistor. The rectifier module includes a second diode, a third diode and a first capacitor. The second diode has a positive terminal coupled to a first output terminal of the first inductor. The third diode is coupled to the second diode in parallel. The first capacitor has a first terminal coupled to negative terminals of both the second diode and the third diode and has a second terminal coupled to ground. The filter module includes a second capacitor, a third capacitor, a first resistor and a second resistor. The second capacitor has a first terminal coupled to ground and a second terminal coupled to negative terminals of both the second diode and the third diode. The third capacitor has a first terminal coupled to the second terminal of the second capacitor and a second terminal coupled to ground. The first resistor is coupled to the third capacitor in parallel. The second resistor is coupled to the first resistor in parallel.

In one example, the transformer module further includes a fourth diode, a fourth capacitor, a fifth capacitor, a third resistor, a fourth resistor, a fifth resistor, a sixth capacitor, a sixth resistor, a fifth diode, a seventh capacitor, a seventh resistor, a sixth diode, an eighth resistor, a ninth resistor, and a tenth resistor. The fourth diode has a positive terminal coupled to a third input terminal of the first inductor. The fourth capacitor has a first terminal coupled to ground and a second terminal coupled to a fourth input terminal of the first inductor. The fifth capacitor has a first terminal coupled to the second terminal of the fourth capacitor. The third resistor is coupled to the fifth capacitor in parallel. The fourth resistor is coupled to the third resistor in parallel. The fifth resistor has a first terminal coupled to a negative terminal of the fourth diode and a second terminal coupled to a second terminal of the fifth capacitor. The sixth capacitor has a first terminal coupled to the first input terminal of the first inductor and a second terminal coupled to the second input terminal of the first inductor. The sixth resistor has a first terminal coupled to the second terminal of the sixth capacitor. The fifth diode has a positive terminal coupled to a second terminal of the sixth resistor and a negative terminal coupled to an emitter of the bipolar transistor. The seventh capacitor has a first terminal coupled to the emitter of the bipolar transistor and a second terminal coupled to the first terminal of the sixth capacitor and the positive terminal of the first diode. The seventh resistor has a first terminal coupled to the emitter of the bipolar transistor and a second terminal coupled to the gate of the bipolar transistor. The sixth diode has a positive terminal coupled to a gate of the p-type MOSFET and having a negative terminal coupled to the duty cycle adjusting module. The eighth resistor has a first terminal coupled to the positive terminal of the sixth diode and a second terminal coupled to a drain of the p-type MOSFET. The ninth resistor has a first terminal coupled to the positive terminal of the sixth diode. The tenth resistor has a first terminal coupled to the negative terminal of the sixth diode and a second terminal coupled to a second terminal of the seventh resistor. The rectifier module further includes an eighth capacitor and an eleventh resistor. The eighth capacitor has a first terminal coupled to the positive terminals of the second diode and the third diode. The eleventh resistor has a first terminal coupled to a second terminal of the eighth capacitor and a second terminal coupled to the negative terminals of the second diode and the third diode.

In one example, the duty cycle adjusting module includes a first capacitor, a second capacitor, a first resistor and a first diode. The first capacitor has a first terminal coupled to ground and a second terminal coupled to the voltage/current output control module for receiving the voltage feedback signal. The second capacitor has a first terminal coupled to the second terminal of the first capacitor. The first resistor has a first terminal coupled to a second terminal of the second capacitor. The first diode has a negative terminal coupled to a second terminal of the first resistor. The control integrated circuit has a first input terminal coupled to the second terminal of the first capacitor, a second input terminal coupled to the second terminal of the second capacitor, and a first output terminal and a second output terminal coupled to the power outputting module for forwarding the phase-width modulation signal.

In one example, the voltage/current output control module includes an integrated circuit, a diode, a first resistor, a first capacitor, a second resistor, a second capacitor, a third resistor and a third capacitor. The integrated circuit has a first input terminal coupled to an upper threshold voltage, a second input terminal coupled to a lower threshold voltage, and a ground terminal coupled to ground. The diode has a positive terminal coupled to the duty cycle adjusting module and a positive input terminal of a signal feedback module that is configured to forward the voltage feedback signal to the duty cycle adjusting module, and has a negative terminal coupled to an output terminal of the integrated circuit. The first resistor has a first terminal coupled to the second input terminal of the integrated circuit and a second terminal coupled to a second input terminal of the signal feedback module. The first capacitor has a first terminal coupled to a first intermediate terminal of the integrated circuit. The second resistor has a first terminal coupled to a second terminal of the first capacitor and a second terminal coupled to the negative terminal of the diode. The second capacitor has a first terminal coupled to the ground terminal of the integrated circuit. The third resistor has a first terminal coupled a second terminal of the second capacitor. The third capacitor has a first terminal coupled to a second terminal of the third resistor and a second terminal coupled to ground.

In one embodiment, a light device driving system includes a voltage source managing module, a duty cycle adjusting module, a control integrated circuit, a power outputting module, a passive lighting device, a current sampling module, a voltage dimmer, a threshold setting module and a voltage/current output control module. The voltage source managing module is configured to generate an input voltage. The duty cycle adjusting module is configured to adjust a duty cycle of a phase-width modulation signal of the light device driving system according to a voltage feedback signal. The control integrated circuit is configured to generate the phase-width modulation signal based on the adjusted duty cycle. The power outputting module is configured to generate an output voltage by modulating the input voltage using the adjusted duty cycle. The passive lighting device is configured to illuminate using the output voltage. The current sampling module is configured to sample the output voltage to generate a result of sampling the output voltage. The voltage dimmer is configured to generate a voltage dimming signal. The threshold setting module is configured to limit a voltage level of the voltage dimming signal between an upper threshold voltage and a lower threshold voltage. The voltage/current output control module is configured to generate the voltage feedback signal according to the result of sampling the output voltage and the voltage dimming signal. The voltage/current output control module is also configured to forward the voltage feedback signal to the duty cycle adjusting module. The voltage dimmer includes a first bipolar transistor, a second bipolar transistor, a first diode, a comparator and a second diode. The first bipolar transistor has a base terminal coupled to ground and a collector terminal coupled to a positive terminal of a standard dimmer voltage source. The second bipolar transistor has a base terminal coupled to a transmitter terminal of the first bipolar transistor, a collector terminal coupled to the base terminal of the first bipolar transistor, and a transmitter terminal coupled to the base terminal of the second bipolar transistor and an upper threshold voltage. The first diode has a negative side coupled to a standard dimmer voltage source and having a positive side coupled to ground. The comparator has an upper threshold terminal coupled to the upper threshold voltage, a lower threshold terminal coupled to ground, a positive input terminal coupled to the negative terminal of the first diode, a negative input side coupled to the positive terminal of the first diode and a lower threshold voltage, and an output side coupled to the negative input terminal of the comparator. The second diode has a negative terminal coupled to the negative input terminal of the comparator and a positive terminal coupled to ground. The threshold setting module includes a first resistor and a second resistor. The first resistor has a first side coupled to the upper threshold voltage and a second side coupled to the lower threshold voltage. The second resistor has a first side coupled to the second side of the first resistor and a second side coupled to the negative side of the second diode.

In one example, the voltage dimmer further includes a third resistor, a fourth resistor, a fifth resistor, a sixth resistor, a seventh resistor, an eighth resistor, a ninth resistor, a tenth resistor, an eleventh resistor, a twelfth resistor, a thirteenth resistor, a fourteenth resistor, a first capacitor and a second capacitor. The third resistor has a first terminal coupled to ground and a second terminal coupled to the base terminal of the first bipolar transistor. The fourth resistor has a first terminal coupled to the base terminal of the second bipolar transistor and a second terminal coupled to the emitter terminal of the second bipolar transistor. The fifth resistor is coupled to the first diode in parallel. The sixth resistor has a first terminal coupled to the upper threshold voltage. The seventh resistor has a first terminal coupled to a second terminal of the sixth resistor and a second terminal coupled to the positive terminal of the first diode. The eighth resistor has a first terminal coupled to the second terminal of the sixth resistor and a second terminal coupled to the negative terminal of the second diode. The ninth resistor has a first terminal coupled to the output terminal of the comparator and a second terminal coupled to the negative terminal of the second diode. The tenth resistor has a first terminal coupled to the negative input terminal of the comparator and the output terminal of the comparator. The eleventh resistor has a first terminal coupled to the negative terminal of the second diode. The twelfth resistor has a first terminal coupled to a second terminal of the eleventh resistor and a second terminal coupled to the positive terminal of the second diode. The thirteenth resistor has a first terminal coupled to the standard dimmer voltage source and a second terminal coupled to the collector terminal of the first bipolar transistor. The fourteenth resistor has a first terminal coupled to the collector terminal of the first bipolar transistor and a second terminal coupled to the positive input terminal of the comparator. The first capacitor is coupled to the first diode in parallel. The second capacitor has a first terminal coupled to the negative input terminal of the comparator and a second terminal coupled to the output terminal of the comparator. The threshold setting module further includes a fifteenth resistor, a sixteenth resistor, a third capacitor and a fourth capacitor. The fifteenth resistor has a first terminal coupled to the lower threshold voltage and a second terminal coupled to the second terminal of the first resistor. The sixteenth resistor has a first terminal coupled to the second terminal of the first resistor and a second terminal coupled to ground. The third capacitor has a first terminal coupled to the upper threshold voltage and a second terminal coupled to the first terminal of the first resistor. The fourth capacitor is coupled to the sixteenth resistor in parallel.

The duty cycle adjusting module includes a first capacitor, a second capacitor, a first resistor and a first diode. The first capacitor has a first terminal coupled to ground and a second terminal coupled to the voltage/current output control module for receiving the voltage feedback signal. The second capacitor has a first terminal coupled to the second terminal of the first capacitor. The first resistor has a first terminal coupled to a second terminal of the second capacitor. The first diode has a negative terminal coupled to a second terminal of the first resistor. The control integrated circuit has a first input terminal coupled to the second terminal of the first capacitor, a second input terminal coupled to the second terminal of the second capacitor, and a first output terminal and a second output terminal coupled to the power outputting module for forwarding the phase-width modulation signal.

These and other objectives of the present invention will no doubt become obvious to those of ordinary skill in the art after reading the following detailed description of the preferred embodiment that is illustrated in the various figures and drawings.

DETAILED DESCRIPTION

For improving the defects of conventional light devices, the present invention provides a light device driving system capable of generating a pulse-width modulation (PWM) signal having an adjustable duty cycle.

Figure 1:
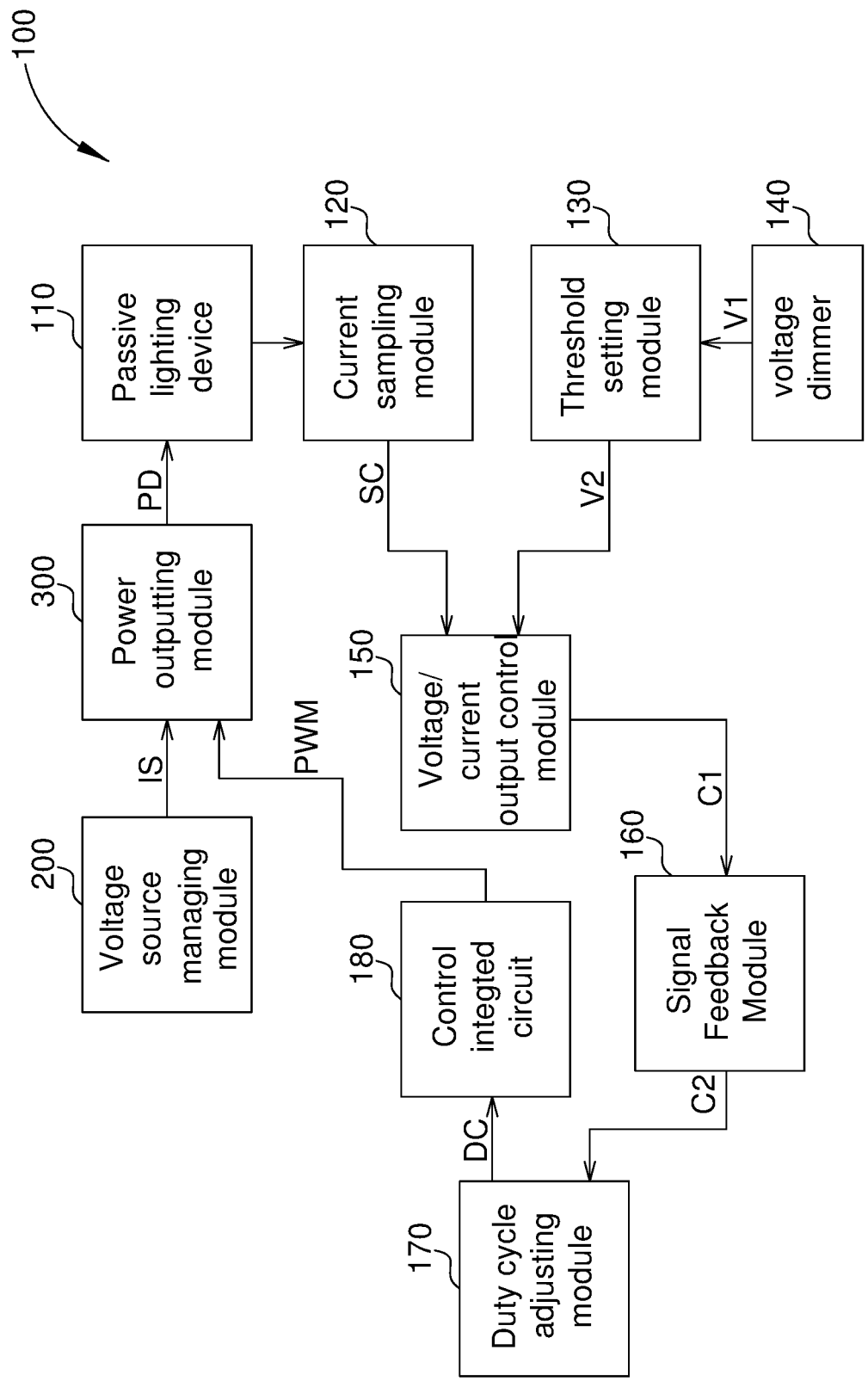
FIG. 1 illustrates a block diagram of a light device driving system according to one embodiment of the present invention.

FIG. 1 illustrates a block diagram of a light device driving system 100 according to one embodiment of the present invention. The light device driving system 100 includes at least a voltage source managing module 200, a duty cycle adjusting module 170, a control integrated circuit 180, a power outputting module 300, a passive lighting device 110, and a voltage/current output control module 150.

In one example, the voltage source managing module 200 generates an input voltage IS. The duty cycle adjusting module adjusts a duty cycle DC of a phase-width modulation signal PWM according to a voltage feedback signal C2. The control integrated circuit 180 generates the phase-width modulation signal PWM based on the adjusted duty cycle DC. The phase-width modulation signal PWM is to be applied by the light device driving system 100. The power outputting module 300 generates an output voltage PD by modulating the input voltage IS using the adjusted duty cycle DC, i.e., in form of the pulse-width modulation signal PWM. The passive lighting device 110 illuminates itself using the output voltage PD. When the passive lighting device 110 illuminates, the output voltage PD is also sampled in a form of the passive light device 110's sample current. In this way, the voltage/current output control module 150 generates a voltage feedback signal C1 according to the output voltage PD and a voltage dimming signal V2. The voltage/current output control module 150 also forwards the voltage feedback signal C1 to the duty cycle adjusting module 170, e.g., in another form by the voltage feedback signal C2.

More specifically, in one example, the light device driving system 100 further includes a current sampling module 120, a voltage dimmer 140, a threshold setting module 130, and a signal feedback module 160.

The current sampling module 120 samples the output voltage PD and forwards a result of sampling the output voltage PD to the voltage/current output control module 150.

The voltage dimmer 140 generates a voltage dimming signal V1 based on its self-dimming mechanism. The threshold setting module 130 limits a voltage level of the voltage dimming signal V1 between an upper threshold voltage VTOP and a lower threshold voltage VLOW.

The signal feedback module 160 forwards a voltage feedback signal C1 from the voltage/current output control signal module 150 to the duty cycle adjusting module 170 by photo-coupling, in the form of the voltage feedback signal C2.

A first objective of the present invention aims at neutralizing the long starting time while applying a low dimmer voltage. For such purpose, while the light device driving system 100 starts or wakes, the voltage/current output control module 150 ignoring the voltage dimming signal V2 in the first place, i.e., ignoring the voltage dimming signal V1. On top of that, the duty cycle adjusting module 170 also initially increases the duty cycle DC. Such that the control integrated circuit 180 generates the phase-width modulation signal PWM with a larger duty cycle in the beginning. In this way, the light device driving system 100 neutralized its slow start issue.

A second objective of the present invention is to operate the light device driving system 100 using the pulse-width modulation signal PWM having a dynamically-adjustable duty cycle. In this way, the light device driving system 100 can steadily maintain its stability in operation and avoid damages to its internal elements caused by an unstable input voltage. For fulfilling such purpose, a feedback loop in turn including at least the power outputting module 300, the passive lighting device 110, the voltage/current output control module 150, the duty cycle adjusting module 170 is formed. The feedback loop samples the output voltage PD from the passive lighting device 110, limits the voltage scope of the sampled voltage using the voltage dimming signal V2, adjusts the duty cycle DC of the pulse-width modulation signal PWM using the limited feedback signal, and feeds the power outputting device 300 with the pulse-width modulation signal PWM acquiring the adjusted duty cycle DC. In this way, the duty cycle DC used by the output voltage PD can be maintained in a specific range without unstably vibration.

In one example, the signal feedback module 160 aids the voltage/current outputting module 150 in forwarding and maintaining the feedback signal C1's magnitude by photo-coupling. That is, the signal feedback module 160 generates the feedback signal C2 by referencing and/or strengthening the feedback signal C1's magnitude.

In one example, the current sampling module 120 aids the voltage/current output control module 150 in sampling the output voltage PD from the passive light device 110, e.g., in the form of the sample current SC.

A third purpose of the present invention is to prevent the light device driving system 100 from unexpectedly shutting down because of a sudden low input voltage. Such that the light device driving system 100 may also prevent the passive lighting device 110 from unconditionally malfunctioning. For achieve such advantage, in one example, the threshold setting module 130 sets the lower bound threshold voltage VLOW. The threshold setting module 130 also works with the voltage dimmer 140 using the lower bound threshold voltage VLOW for controlling the feedback signals C1 and/or C2, such that the duty cycle adjusting module 170 raises the duty cycle DC in response. As a result, with the aid of the raised duty cycle in the pulse-width modulation signal PWM, even if the input voltage IS is suddenly at a low voltage level, the passive light device 110 still acquires enough power from the output voltage PD for its normal operation. In this way, the passive light device 110 can be avoided from a sudden turned-off event.

However, the solution for the third issue may cause an undesired over-large duty cycle. Such over-large duty cycle may malfunction the light device driving system 100 and/or the passive light device 110's internal elements. For preventing such over-large duty cycle, in one example, the threshold setting module 130 sets the upper bound threshold voltage VTOP. The threshold setting module 130 also works with the voltage dimmer 140 using the upper bound threshold voltage VTOP for controlling the feedback signals C1 and/or C2. Such that the duty cycle adjusting module 170 lowers the duty cycle DC in response. As a result, with the aid of the lowered duty cycle DC in the pulse-width modulation signal PWM, the passive light device 110 can be prevented from being damaged by over-high output voltage PD.

Figure 2:
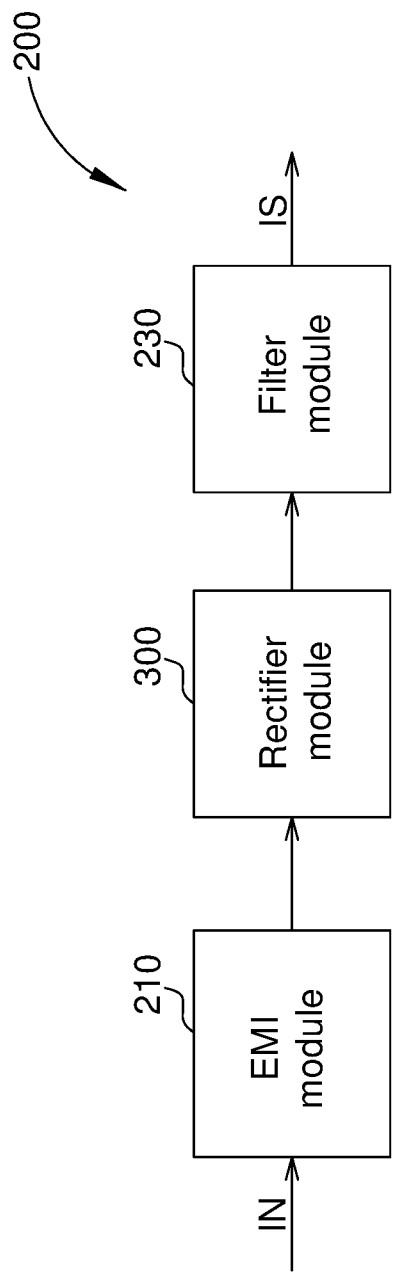
FIG. 2 illustrates the voltage source managing module shown in FIG. 1 according to one example.

FIG. 2 illustrates the voltage source managing module 200 according to one example. The voltage source managing module 200 includes an electromagnetic interference (EMI) module 210, a rectifier module 220 and a filter module 230. The EMI module 210 protects the input voltage IS from being affected by external electromagnetic interference. The rectifier module 220 transforms a current property of the input voltage IS, e.g., from an AC voltage to a DC voltage. The filter module 230 filters off noises within the input voltage IS.

Figure 3:
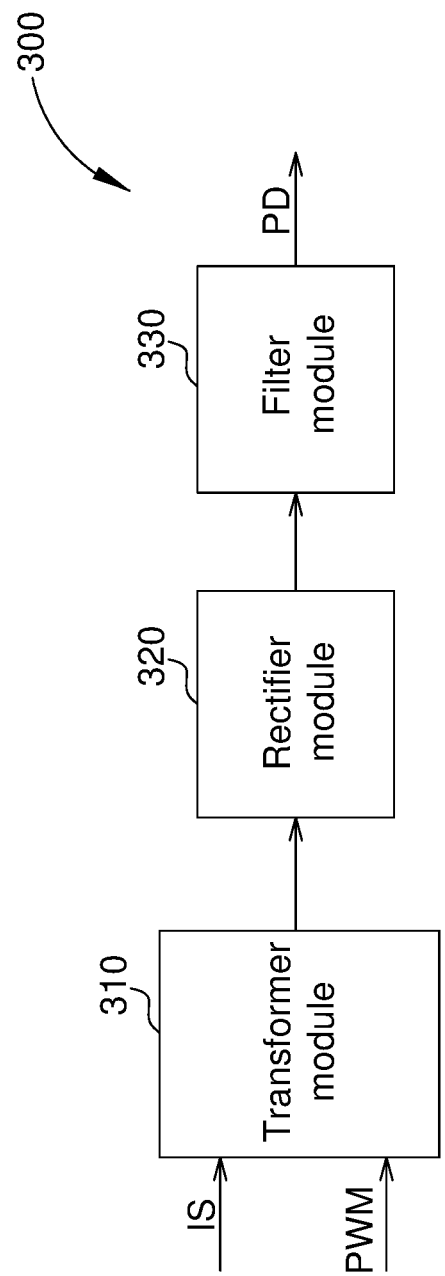
FIG. 3 illustrates the power outputting module shown in FIG. 1 according to one example.

FIG. 3 illustrates the power outputting module 300 according to one example. The power outputting module 300 includes a transformer module 310, a rectifier module 320 and a filter module 330. The transformer module 310 transforms a voltage level of the output voltage PD. The rectifier module 320 transforms a current property of the output voltage PD. The filter module 330 filters off noises within the output voltage PD.

Figure 4:
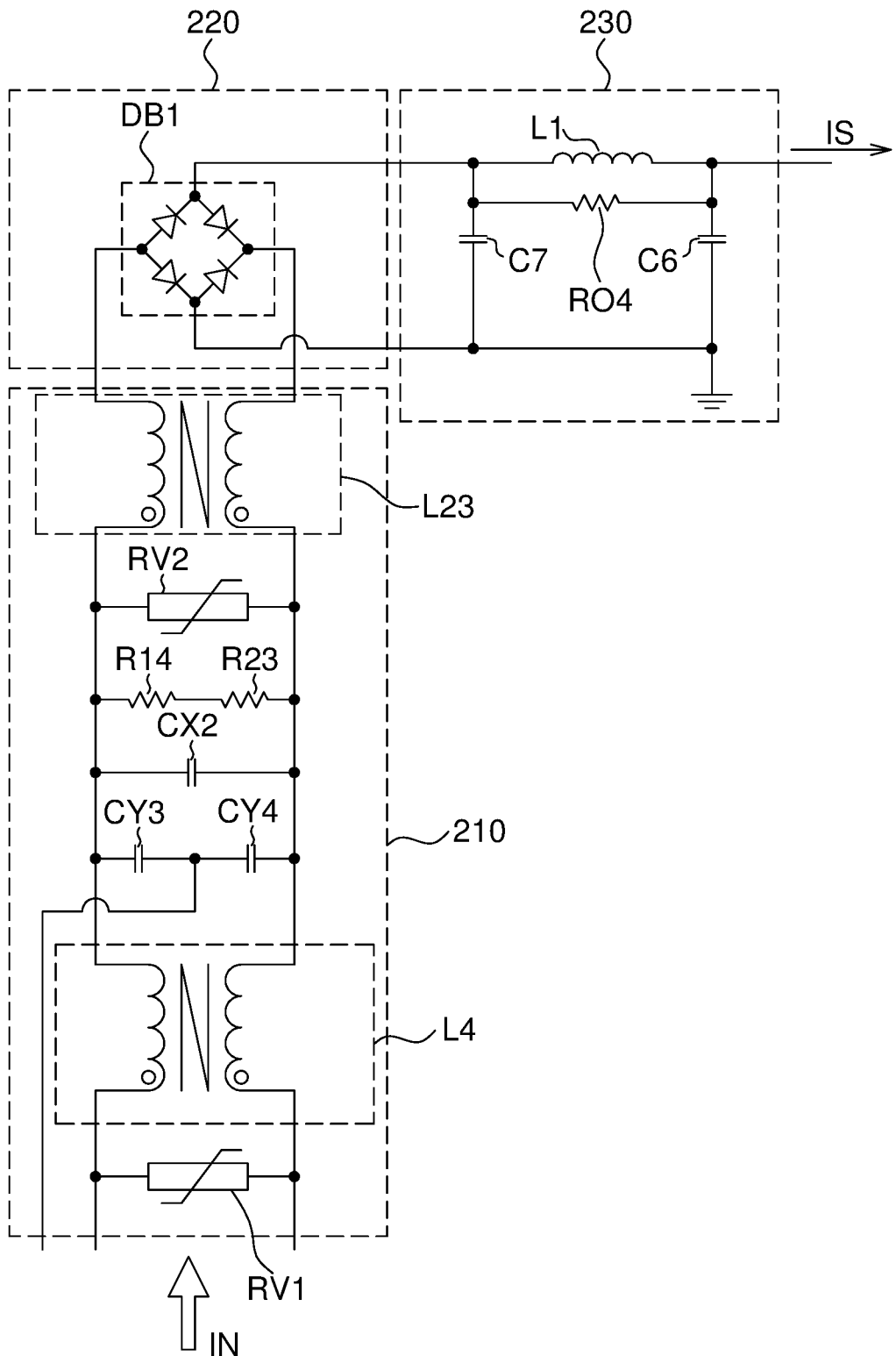
FIG. 4 illustrates a detailed diagram of the voltage source managing module shown in FIG. 2 according to one example.

FIG. 4 illustrates a detailed diagram of the voltage source managing module 200 according to one example. In one example, the EMI module 210 includes a first variable resistor RV1, a first inductor L4, a first capacitor CY3, a second capacitor CY4, a second variable resistor RV2, and a second inductor L23. The first inductor L4 has a first input terminal coupled to a first terminal of the first variable resistor RV1. The first inductor L4 also has a second input terminal coupled to a second terminal of the first variable resistor RV1. The first capacitor CY3 has a first terminal coupled to ground. The first capacitor CY3 also has a second terminal coupled to a first output terminal of the first inductor L4. The second capacitor CY4 has a first terminal coupled to ground. The second capacitor CY4 also has a second terminal coupled to a second output terminal of the first inductor L4. The second variable resistor RV2 is coupled to the first inductor L4 in parallel. The second inductor L23 has a first input terminal coupled to a first terminal of the second variable resistor RV2. The second inductor L23 has a second input terminal coupled to a second terminal of the second variable resistor RV2.

In one example, the rectifier module 220 includes a full bridge rectifier DB1. The full bridge rectifier DB1 has a first terminal coupled to a first output terminal of the second inductor L23. The full bridge rectifier DB1 also has a second terminal coupled to a second output terminal of the second inductor L23. Last, the full bridge rectifier DB1 has a third terminal coupled to ground.

In one example, the filter module 230 includes a first resistor R04, a third capacitor C7, a fourth capacitor C6 and a third inductor L1. The first variable resistor RV1 coupled to an input voltage source IN in parallel. The first resistor R04 has a first terminal coupled to a fourth terminal of the full bridge rectifier DB1. The third capacitor C7 has a first terminal coupled to the first terminal of the first resistor R04. The third capacitor C7 also has a second terminal coupled to the third terminal of the full bridge rectifier DB1. The fourth capacitor C6 is coupled to the third capacitor C7 in parallel. The third inductor L1 is coupled to the first resistor R04 in parallel.

In one example, the EMI module 210 further includes a fifth capacitor CX2, a second resistor R14 and a third resistor R23. The fifth capacitor CX2 has a first terminal coupled to the second terminal of the first capacitor CY3. The fifth capacitor CX2 also has a second terminal coupled to the second terminal of the second capacitor CY4. The second resistor R14 has a first terminal coupled to the first terminal of the fifth capacitor CX2. The third resistor R23 has a first terminal coupled to a second terminal of the second resistor R14. The third resistor R23 also has a second terminal coupled to the second terminal of the fifth capacitor CX2.

Figure 5:
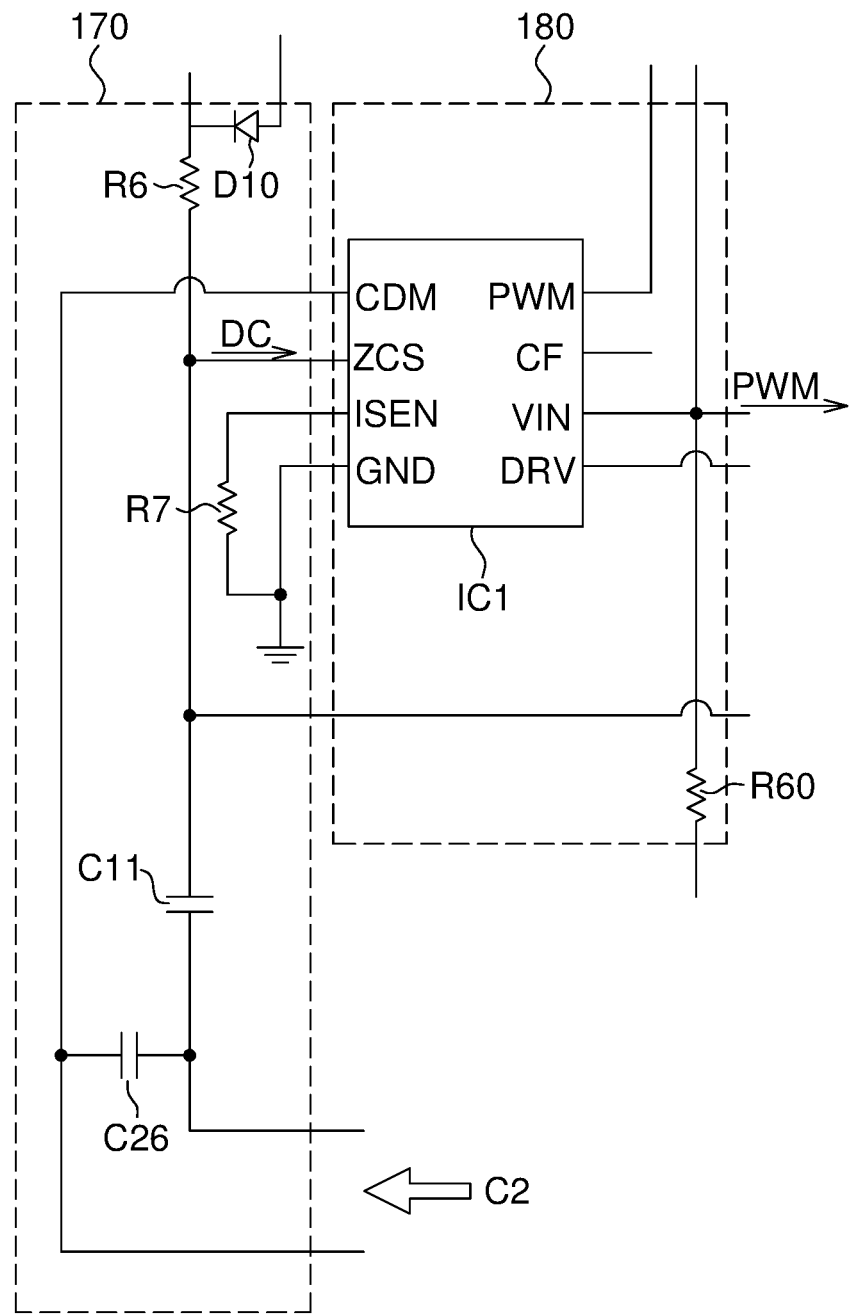
FIG. 5 illustrates the duty cycle adjusting module and the control integrated circuit shown in FIG. 1 according to one embodiment of the present invention.

FIG. 5 illustrates the duty cycle adjusting module 170 and the control integrated circuit 180 according to one embodiment of the present invention. In one example, the duty cycle adjusting module 170 includes a first capacitor C26, a second capacitor C11, a first resistor R6 and a first diode D10. The first capacitor C26 has a first terminal coupled to ground. The first capacitor C26 also has a second terminal coupled to the voltage/current output control module 150 for receiving the voltage feedback signal C2, e.g. with the aid of the signal feedback module 160. The second capacitor C11 has a first terminal coupled to the second terminal of the first capacitor C26. The first resistor R6 has a first terminal coupled to a second terminal of the second capacitor C11. The first diode D10 has a negative terminal coupled to a second terminal of the first resistor R6. In one example, the control integrated circuit 180 may include a chip IC1. The chip IC1 has a first input terminal coupled to the second terminal of the first capacitor C26. The chip IC1 has also a second input terminal coupled to the second terminal of the second capacitor C11. And the chip IC1 has a first output terminal and a second output terminal coupled to the power outputting module 300 for forwarding the phase-width modulation signal PWM.

Figure 6:
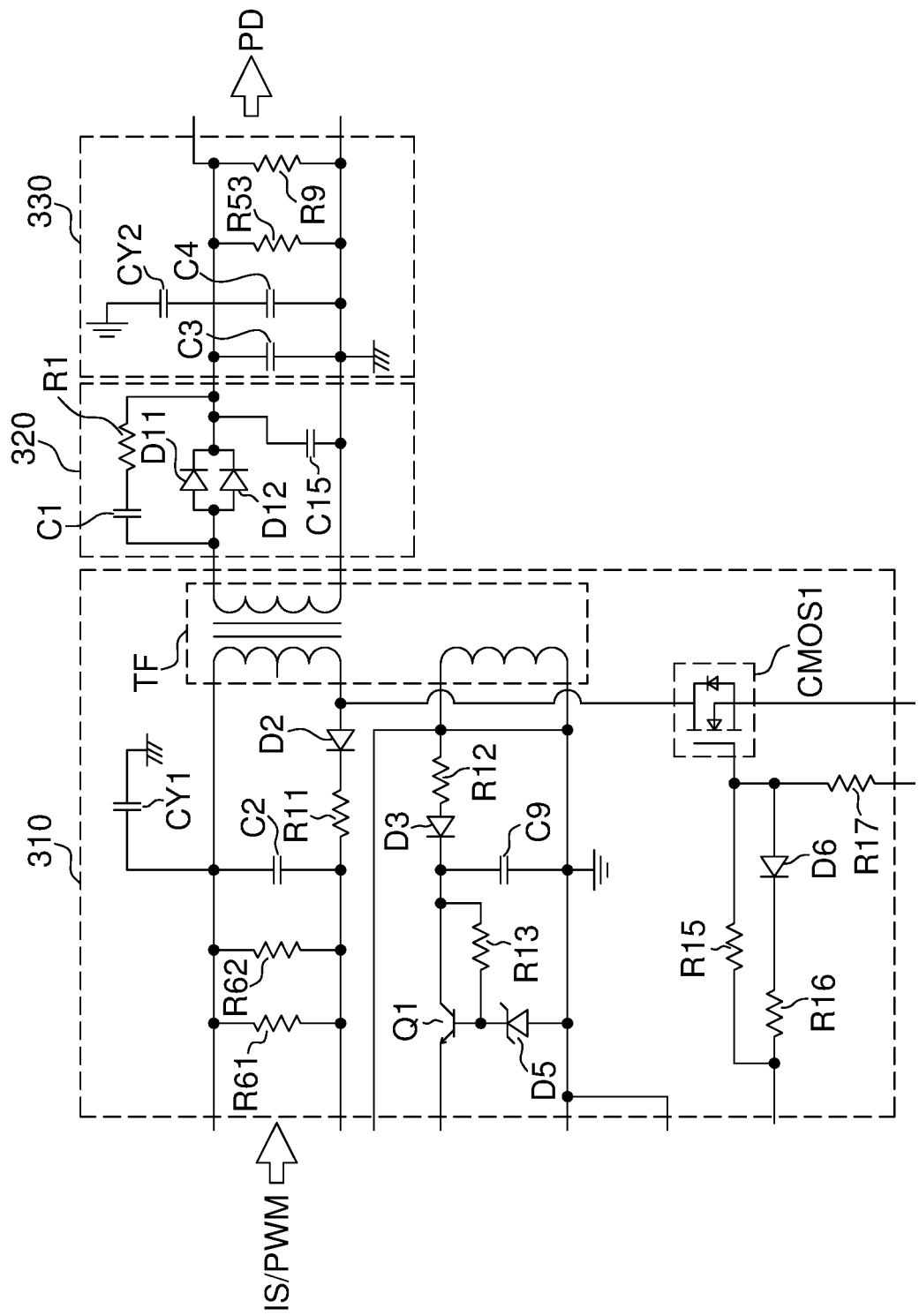
FIG. 6 illustrates a detailed diagram of the power outputting module shown in FIG. 3 according to one embodiment of the present invention.

FIG. 6 illustrates a detailed diagram of the power outputting module 300 according to one embodiment of the present invention. In one example, the transformer module 310 includes a first inductor TF, a p-type metal-oxide-semiconductor field-effect transistor (p-type MOSFET) CMOS1, a bipolar transistor Q1 and a first diode D5. The p-type MOSFET CMOS1 has a gate and a drain both coupled to ground. The p-type MOSFET CMOS1 also has a source coupled to a first input terminal of the first inductor TF. The bipolar transistor Q1 has a drain coupled to a second input terminal of the first inductor TF. The bipolar transistor Q1 also has a collector coupled to the duty cycle adjusting module 170. The first diode D5 has a positive terminal coupled to the first input terminal of the first inductor TF. The first diode D5 also has a negative terminal coupled to a gate and the drain of the bipolar transistor Q1.

In one example, the rectifier module 320 includes a second diode D11, a third diode D12 and a first capacitor C15. The second diode D11 has a positive terminal coupled to a first output terminal of the first inductor TF. The third diode D12 coupled to the second diode D11 in parallel. The first capacitor C15 has a first terminal coupled to negative terminals of both the second diode D11 and the third diode D12. The first capacitor C15 also has a second terminal coupled to ground.

In one embodiment, the filter module 330 includes a second capacitor CY2, a third capacitor C4, a first resistor R53 and a second resistor R9. The second capacitor CT2 has a first terminal coupled to ground. The second capacitor CT2 also has a second terminal coupled to negative terminals of both the second diode D11 and the third diode D12. The third capacitor C4 has a first terminal coupled to the second terminal of the second capacitor CY2. The third capacitor C4 also has a second terminal coupled to ground. The first resistor R53 is coupled to the third capacitor C4 in parallel. The second resistor R9 is coupled to the first resistor R53 in parallel.

In one example, the transformer module 310 further includes a fourth diode D3, a fourth capacitor CY1, a fifth capacitor C2, a third resistor R62, a fourth resistor R61, a fifth resistor R11, a sixth capacitor C8, a sixth resistor R12, a fifth diode D3, a seventh capacitor C9, a seventh resistor R13, a sixth diode D6, an eighth resistor R17, a ninth resistor R15 and a tenth resistor R16. The fourth diode D3 has a positive terminal coupled to a third input terminal of the first inductor TF. The fourth capacitor CY1 has a first terminal coupled to ground. The fourth capacitor CY1 also has a second terminal coupled to a fourth input terminal of the first inductor TF. The fifth capacitor C2 has a first terminal coupled to the second terminal of the fourth capacitor CY1. The third resistor R62 is coupled to the fifth capacitor C2 in parallel. The fourth resistor R61 is coupled to the third resistor R62 in parallel. The fifth resistor R11 has a first terminal coupled to a negative terminal of the fourth diode D3. The fifth resistor R11 also has a second terminal coupled to a second terminal of the fifth capacitor C2. The sixth capacitor C8 has a first terminal coupled to the first input terminal of the first inductor TF. The sixth capacitor C8 also has a second terminal coupled to the second input terminal of the first inductor TF. The sixth resistor R12 has a first terminal coupled to the second terminal of the sixth capacitor C8. The fifth diode D3 has a positive terminal coupled to a second terminal of the sixth resistor R12. The fifth diode D3 also has a negative terminal coupled to an emitter of the bipolar transistor Q1. The seventh capacitor C9 has a first terminal coupled to the emitter of the bipolar transistor Q1. The seventh capacitor C9 also has a second terminal coupled to the first terminal of the sixth capacitor C8 and the positive terminal of the first diode D5. The seventh resistor R13 has a first terminal coupled to the emitter of the bipolar transistor Q1. The seventh resistor R13 also has a second terminal coupled to the gate of the bipolar transistor Q1. The sixth diode D6 has a positive terminal coupled to a gate of the p-type MOSFET CMOS1. The sixth diode D6 also has a negative terminal coupled to the duty cycle adjusting module 170. The eighth resistor R17 has a first terminal coupled to the positive terminal of the sixth diode D6. The eighth resistor R17 also has a second terminal coupled to a drain of the p-type MOSFET CMOS1. The ninth resistor R15 has a first terminal coupled to the positive terminal of the sixth diode D6. The tenth resistor R16 has a first terminal coupled to the negative terminal of the sixth diode D6. The tenth resistor R16 has also a second terminal coupled to a second terminal of the seventh resistor R13.

In one example, the rectifier module 320 further includes an eighth capacitor C1 and an eleventh resistor R1. The eighth capacitor C1 has a first terminal coupled to the positive terminals of the second diode D11 and the third diode D12. The eleventh resistor R1 has a first terminal coupled to a second terminal of the eighth capacitor C1. The eleventh resistor R1 also has a second terminal coupled to the negative terminals of the second diode D11 and the third diode D12.

Figure 7:
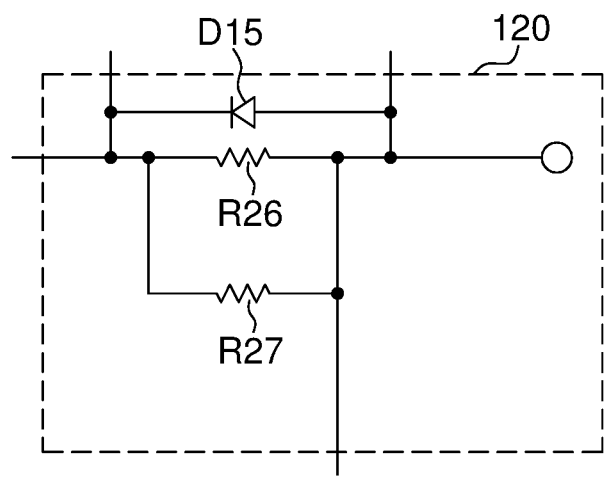
FIG. 7 illustrates a detailed diagram of the current sampling module shown in FIG. 1 according to one embodiment of the present invention.

FIG. 7 illustrates a detailed diagram of the current sampling module 120 according to one embodiment of the present invention. The current sampling module 120 includes a first resistor R26 and a second resistor R27. The first resistor R26 has a first side and a second side coupled to the passive lighting device 110 for sampling the output voltage PD. The second resistor R27 is coupled to the first resistor R26 in parallel. The second resistor R27 has a third side coupled to the voltage/current output control module 150 for forwarding the result of sampling the output voltage PD.

Figure 8:
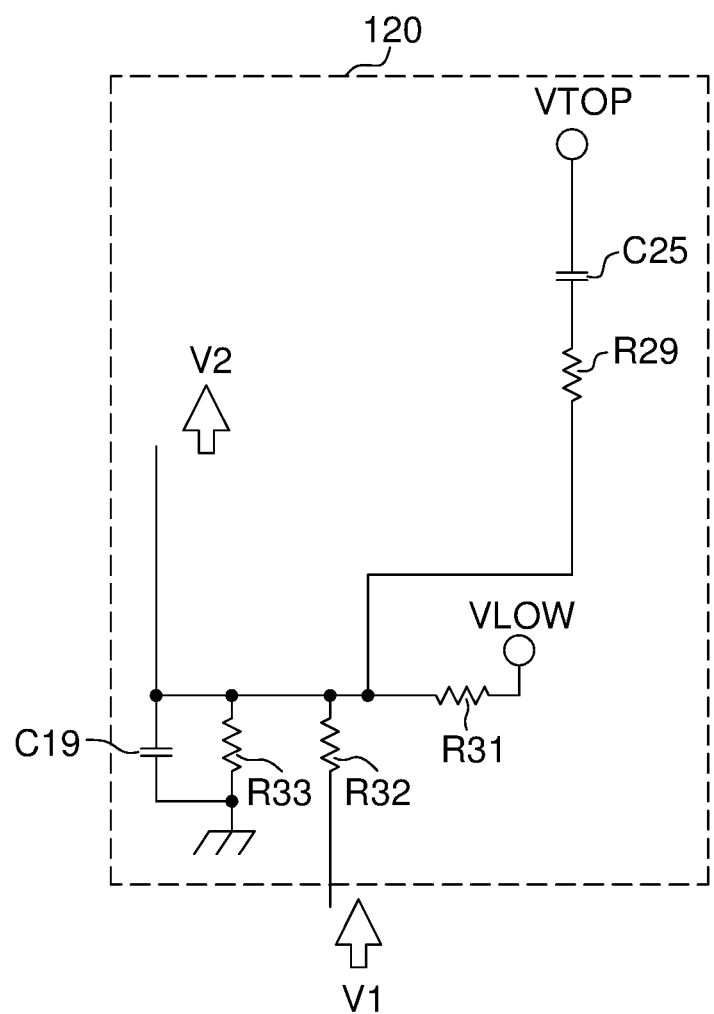
FIG. 8 illustrates a detailed diagram of the threshold setting module shown in FIG. 1 according to one embodiment of the present invention.
Figure 9:
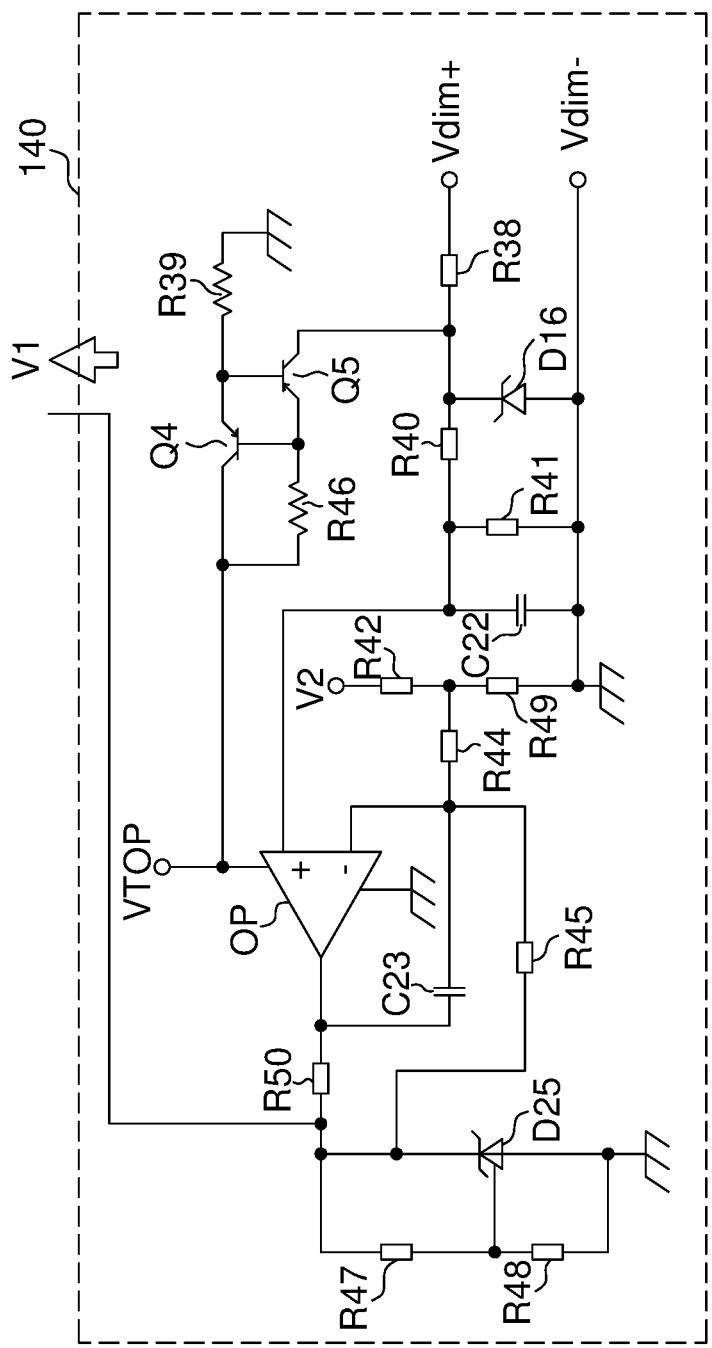
FIG. 9 illustrates a detailed diagram of the voltage dimmer shown in FIG. 1 according to one embodiment of the present invention.

FIG. 8 illustrates a detailed diagram of the threshold setting module 130 according to one embodiment of the present invention. FIG. 9 illustrates a detailed diagram of the voltage dimmer 140 according to one embodiment of the present invention.

In one example, the voltage dimmer 140 includes a first bipolar transistor Q4, a second bipolar transistor Q5, a first diode D16, a comparator OP and a second diode D25. The first bipolar transistor Q4 has a base terminal coupled to ground. The first bipolar transistor Q4 also has a collector terminal coupled to a positive terminal of a standard dimmer voltage source Vdim+. The second bipolar transistor Q5 has a base terminal coupled to a transmitter terminal of the first bipolar transistor Q4. The second bipolar transistor Q5 also has a collector terminal coupled to the base terminal of the first bipolar transistor Q4. And the second bipolar transistor Q5 has a transmitter terminal coupled to the base terminal of the second bipolar transistor Q5 and an upper threshold voltage VTOP. The first diode D16 has a negative side coupled to the standard dimmer voltage source Vdim+. The first diode D16 also has a positive side coupled to ground. The comparator OP has an upper threshold terminal coupled to the upper threshold voltage VTOP. The comparator OP also has a lower threshold terminal coupled to ground. In addition, the comparator OP has a positive input terminal coupled to the negative terminal of the first diode D16. And the comparator OP has a negative input side coupled to the positive terminal of the first diode D16 and a lower dimming voltage Vdim−. The comparator OP also has an output side coupled to the negative input terminal of the comparator OP. The second diode D25 has a negative terminal coupled to the negative input terminal of the comparator OP. The second diode D25 also has a positive terminal coupled to ground.

In one example, the threshold setting module 130 includes a first resistor R29 and a second resistor R32. The first resistor R29 has a first side coupled to the upper threshold voltage VTOP and a second side coupled to the lower threshold voltage VLOW. The second resistor R32 has a first side coupled to the second side of the first resistor R29. The second resistor R32 also has a second side coupled to the negative side of the second diode D25.

In one example, the voltage dimmer 140 further includes a third resistor R39, a fourth resistor R46, a fifth resistor R41, a sixth resistor R42, a seventh resistor R49, an eighth resistor R44, a ninth resistor R50, a tenth resistor R45, an eleventh resistor R47, a twelfth resistor R48, a thirteenth resistor R38, a fourteenth resistor R40, a first capacitor C22 and a second capacitor C23. The third resistor R39 has a first terminal coupled to ground. The third resistor R39 also has a second terminal coupled to the base terminal of the first bipolar transistor Q4. The fourth resistor R46 has a first terminal coupled to the base terminal of the second bipolar transistor Q5. The fourth resistor R46 also has a second terminal coupled to the emitter terminal of the second bipolar transistor Q5. The fifth resistor R41 is coupled to the first diode D16 in parallel. The sixth resistor R42 has a first terminal coupled to the upper threshold voltage VTOP. The seventh resistor R49 has a first terminal coupled to a second terminal of the sixth resistor R42. The seventh resistor R49 also has a second terminal coupled to the positive terminal of the first diode D16. The eighth resistor R44 has a first terminal coupled to the second terminal of the sixth resistor R42. The eighth resistor R44 also has a second terminal coupled to the negative terminal of the second diode D25. The ninth resistor R50 has a first terminal coupled to the output terminal of the comparator OP. The ninth resistor R50 also has a second terminal coupled to the negative terminal of the second diode D25. The tenth resistor R45 has a first terminal coupled to the negative input terminal of the comparator OP and the output terminal of the comparator OP. The eleventh resistor R47 has a first terminal coupled to the negative terminal of the second diode D25. The twelfth resistor R48 has a first terminal coupled to a second terminal of the eleventh resistor R47. The twelfth resistor R48 also has a second terminal coupled to the positive terminal of the second diode D25. The thirteenth resistor R38 has a first terminal coupled to the standard dimmer voltage source Vdim+. The thirteenth resistor R38 also has a second terminal coupled to the collector terminal of the first bipolar transistor Q4. The fourteenth resistor R40 has a first terminal coupled to the collector terminal of the first bipolar transistor Q4. The fourteenth resistor R40 also has a second terminal coupled to the positive input terminal of the comparator OP. The first capacitor C22 is coupled to the first diode D16 in parallel. The second capacitor C23 has a first terminal coupled to the negative input terminal of the comparator OP. The second capacitor C23 also has a second terminal coupled to the output terminal of the comparator OP.

In one example, the threshold setting module 130 further includes a fifteenth resistor R31, a sixteenth resistor R33, a third capacitor C25 and a fourth capacitor C19. The fifteenth resistor R31 has a first terminal coupled to the lower threshold voltage VLOW. The fifteenth resistor R31 also has a second terminal coupled to the second terminal of the first resistor R29. The sixteenth resistor R33 has a first terminal coupled to the second terminal of the first resistor R29. The sixteenth resistor R33 also has and a second terminal coupled to ground. The third capacitor C25 has a first terminal coupled to the upper threshold voltage VTOP. The third capacitor C25 also has a second terminal coupled to the first terminal of the first resistor R29. The fourth capacitor C19 is coupled to the sixteenth resistor R33 in parallel.

Figure 10:
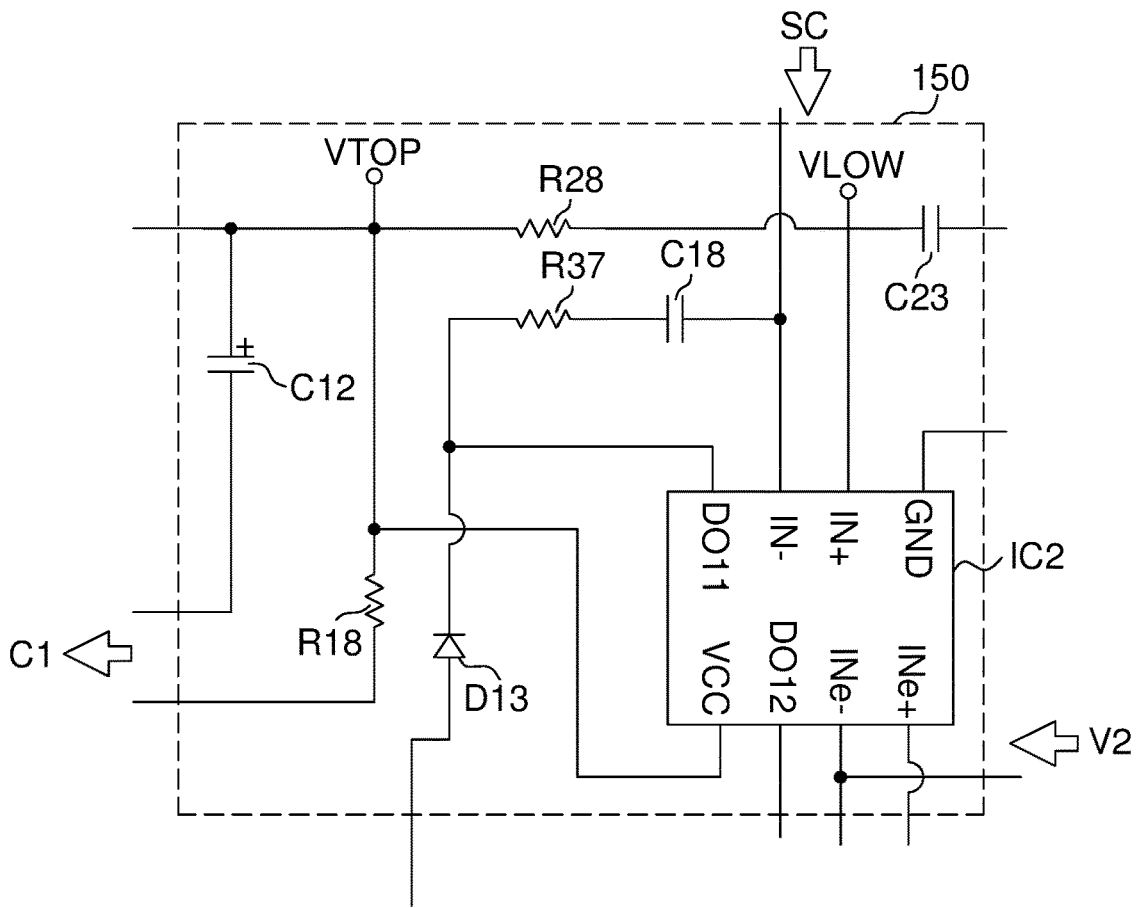
FIG. 10 illustrates a detailed diagram of the voltage/current output control module shown in FIG. 1 according to one embodiment of the present invention.

FIG. 10 illustrates a detailed diagram of the voltage/current output control module 150 according to one embodiment of the present invention. The voltage/current output control module 150 includes an integrated circuit IC, a diode D13, a first resistor R18, a first capacitor C18, a second resistor R37, a second capacitor C18, a third resistor R28 and a third capacitor C12. The integrated circuit IC has a first input terminal coupled to the upper threshold voltage VTOP. The integrated circuit IC also has a second input terminal coupled to the lower threshold voltage VLOW. And the integrated circuit IC has a ground terminal coupled to ground. The diode D13 has a positive terminal coupled to the duty cycle adjusting module 170 and a positive input terminal of a signal feedback module 160, which forwards the voltage feedback signal to the duty cycle adjusting module 170. The diode D13 also has a negative terminal coupled to an output terminal of the integrated circuit IC. The first resistor R18 has a first terminal coupled to the second input terminal of the integrated circuit IC. The first resistor R18 also has a second terminal coupled to a second input terminal of the signal feedback module 160. The first capacitor C18 has a first terminal coupled to a first intermediate terminal of the integrated circuit IC. The second resistor R37 has a first terminal coupled to a second terminal of the first capacitor C18. The second resistor R37 also has a second terminal coupled to the negative terminal of the diode D13. The second capacitor C18 has a first terminal coupled to the ground terminal of the integrated circuit IC. The third resistor R18 has a first terminal coupled to a second terminal of the second capacitor C18. The third capacitor C12 has a first terminal coupled to a second terminal of the third resistor R28. The third capacitor C12 also has a second terminal coupled to ground.

Figure 11:
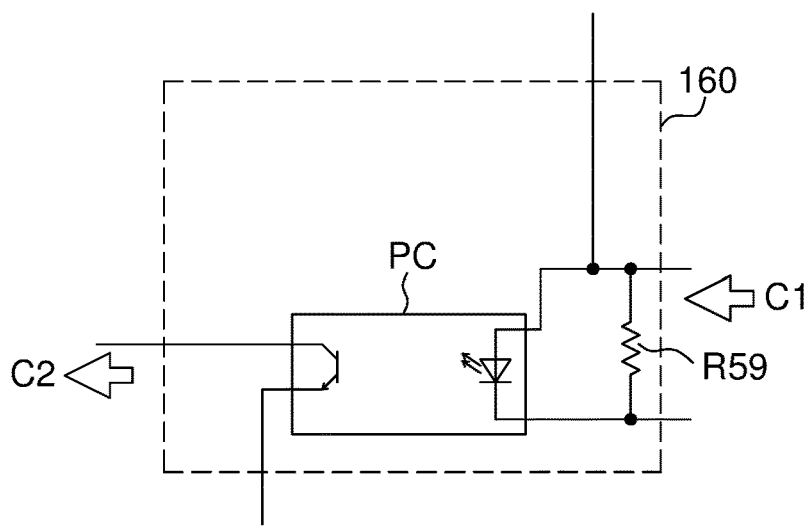
FIG. 11 illustrates a detailed diagram of the signal feedback module shown in FIG. 1 according to one embodiment of the present invention.

FIG. 11 illustrates a detailed diagram of the signal feedback module 160 according to one embodiment of the present invention. The signal feedback module 160 includes a photo coupler PC and a resistor R59. The photo coupler PC has a first side and a second side coupled to the voltage/current output control module 150. The photo coupler PC also has a third side and a fourth side coupled to the duty cycle adjusting module 170 for passing the voltage feedback signal C1 from the voltage/current output control module 150 to the duty cycle adjusting module 170 by photo-coupling. The resistor R59 is coupled to the photo coupler PC in parallel.

In view of above-mentioned embodiments, the present invention can provide a light device driving system having more than one kinds of the dimmers. Thus, the manufactures do not need to respectively prepare a large number of lighting devices with different kinds of dimmers for different clients. Therefore, the storage cost and manufacturing cost can be reduced.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A light device driving system, comprising:
 a voltage source managing module, configured to generate an input voltage;
 a duty cycle adjusting module, configured to adjust a duty cycle of a phase-width modulation signal of the light device driving system according to a voltage feedback signal;
 a control integrated circuit, configured to generate the phase-width modulation signal based on the adjusted duty cycle;
 a power outputting module, configured to generate an output voltage by modulating the input voltage using the adjusted duty cycle;
 a passive lighting device, configured to illuminate using the output voltage; and a voltage/current output control module, configured to generate the voltage feedback signal according to the output voltage and a voltage dimming signal and configured to forward the voltage feedback signal to the duty cycle adjusting module,
 a current sampling module, configured to sample the output voltage and forward a result of sampling the output voltage to the voltage/current output control module, wherein the current sampling module comprises:
  a first resistor, having a first side and a second side coupled to the passive lighting device for sampling the output voltage; and
  a second resistor, coupled to the first resistor in parallel, wherein the second resistor having a third side coupled to the voltage/current output control module for forwarding the result of sampling the output voltage.

2. The light device driving system of claim 1, further comprising:
 a voltage dimmer, configured to generate the voltage dimming signal; and
 a threshold setting module, configured to limit a voltage level of the voltage dimming signal between an upper threshold voltage and a lower threshold voltage.

3. The light device driving system of claim 2, wherein the voltage dimmer comprises:
 a first bipolar transistor having a base terminal coupled to ground and a collector terminal coupled to a positive terminal of a standard dimmer voltage source;
 a second bipolar transistor having a base terminal coupled to a transmitter terminal of the first bipolar transistor, a collector terminal coupled to the base terminal of the first bipolar transistor, and a transmitter terminal coupled to the base terminal of the second bipolar transistor and an upper threshold voltage;
 a first diode, having a negative side coupled to a standard dimmer voltage source and having a positive side coupled to ground;
 a comparator, having an upper threshold terminal coupled to the upper threshold voltage, a lower threshold terminal coupled to ground, a positive input terminal coupled to the negative terminal of the first diode, a negative input side coupled to the positive terminal of the first diode and a lower dimming voltage, and an output side coupled to the negative input terminal of the comparator; and
 a second diode, having a negative terminal coupled to the negative input terminal of the comparator and a positive terminal coupled to ground; and
 wherein the threshold setting module comprises:
 a first resistor, having a first side coupled to the upper threshold voltage and a second side coupled to the lower threshold voltage; and
 a second resistor, having a first side coupled to the second side of the first resistor and a second side coupled to the negative side of the second diode.

4. The light device driving system of claim 3, wherein the voltage dimmer further comprises:
 a third resistor having a first terminal coupled to ground and a second terminal coupled to the base terminal of the first bipolar transistor;
 a fourth resistor having a first terminal coupled to the base terminal of the second bipolar transistor and a second terminal coupled to the emitter terminal of the second bipolar transistor;
 a fifth resistor coupled to the first diode in parallel;
 a sixth resistor having a first terminal coupled to the upper threshold voltage;
 a seventh resistor having a first terminal coupled to a second terminal of the sixth resistor and a second terminal coupled to the positive terminal of the first diode;
 an eighth resistor having a first terminal coupled to the second terminal of the sixth resistor and a second terminal coupled to the negative terminal of the second diode;

a ninth resistor having a first terminal coupled to the output terminal of the comparator and a second terminal coupled to the negative terminal of the second diode;
a tenth resistor having a first terminal coupled to the negative input terminal of the comparator and the output terminal of the comparator;
an eleventh resistor having a first terminal coupled to the negative terminal of the second diode;
a twelfth resistor having a first terminal coupled to a second terminal of the eleventh resistor and a second terminal coupled to the positive terminal of the second diode;
a thirteenth resistor having a first terminal coupled to the standard dimmer voltage source and a second terminal coupled to the collector terminal of the first bipolar transistor;
a fourteenth resistor having a first terminal coupled to the collector terminal of the first bipolar transistor and a second terminal coupled to the positive input terminal of the comparator;
a first capacitor coupled to the first diode in parallel; and
a second capacitor having a first terminal coupled to the negative input terminal of the comparator and a second terminal coupled to the output terminal of the comparator; and
wherein the threshold setting module further comprises:
a fifteenth resistor having a first terminal coupled to the lower threshold voltage and a second terminal coupled to the second terminal of the first resistor;
a sixteenth resistor having a first terminal coupled to the second terminal of the first resistor and a second terminal coupled to ground;
a third capacitor having a first terminal coupled to the upper threshold voltage and a second terminal coupled to the first terminal of the first resistor; and
a fourth capacitor coupled to the sixteenth resistor in parallel.

5. The light device driving system of claim 1, further comprising:
a signal feedback module, configured to forward the voltage feedback signal from the voltage/current output control signal module to the duty cycle adjusting module by photo-coupling.

6. The light device driving system of claim 5, wherein the signal feedback module comprises:
a photo coupler having a first side and a second side coupled to the voltage/current output control module, and having a third side and a fourth side coupled to the duty cycle adjusting module, for passing the voltage feedback signal from the voltage/current output control module to the duty cycle adjusting module by photo-coupling; and
a resistor coupled to the photo coupler in parallel.

7. The light device driving system of claim 1, wherein the voltage source managing module comprises:
an electromagnetic interference (EMI) module, configured to protecting the input voltage from being affected by external electromagnetic interference;
a rectifier module, configured to transform a current property of the input voltage; and
a filter module, configured to filter off noises within the input voltage.

8. The light device driving system of claim 7, wherein the EMI module comprises:
a first variable resistor, coupled to an input voltage source in parallel;
a first inductor, having a first input terminal coupled to a first terminal of the first variable resistor and a second input terminal coupled to a second terminal of the first variable resistor;
a first capacitor, having a first terminal coupled to ground and a second terminal coupled to a first output terminal of the first inductor;
a second capacitor, having a first terminal coupled to ground and a second terminal coupled to a second output terminal of the first inductor;
a second variable resistor, coupled to the first inductor in parallel; and
a second inductor, having a first input terminal coupled to a first terminal of the second variable resistor and a second input terminal coupled to a second terminal of the second variable resistor;
wherein the rectifier module comprises a full bridge rectifier that has a first terminal coupled to a first output terminal of the second inductor, a second terminal coupled to a second output terminal of the second inductor, and a third terminal coupled to ground; and
wherein the filter module comprises:
a first resistor, having a first terminal coupled to a fourth terminal of the full bridge rectifier;
a third capacitor, having a first terminal coupled to the first terminal of the first resistor and a second terminal coupled to the third terminal of the full bridge rectifier;
a fourth capacitor, coupled to the third capacitor in parallel; and
a third inductor, coupled to the first resistor in parallel.

9. The light device driving system of claim 8, wherein the EMI module further comprises:
a fifth capacitor, having a first terminal coupled to the second terminal of the first capacitor and a second terminal coupled to the second terminal of the second capacitor;
a second resistor, having a first terminal coupled to the first terminal of the fifth capacitor; and
a third resistor, having a first terminal coupled to a second terminal of the second resistor and a second terminal coupled to the second terminal of the fifth capacitor.

10. The light device driving system of claim 1, wherein the power outputting module comprises:
a transformer module, configured to transform a voltage level of the output voltage;
a rectifier module, configured to transform a current property of the output voltage; and
a filter module, configured to filter off noises within the output voltage.

11. The light device driving system of claim 10, wherein the transformer module comprises:
a first inductor;
a p-type metal-oxide-semiconductor field-effect transistor (p-type MOSFET), having a gate and a drain both coupled to ground and having a source coupled to a first input terminal of the first inductor;
a bipolar transistor, having a drain coupled to a second input terminal of the first inductor and a collector coupled to the duty cycle adjusting module; and
a first diode, having a positive terminal coupled to the first input terminal of the first inductor and a negative terminal coupled to a gate and the drain of the bipolar transistor; and
wherein the rectifier module comprises:
a second diode, having a positive terminal coupled to a first output terminal of the first inductor;
a third diode, coupled to the second diode in parallel; and a first capacitor, having a first terminal coupled to negative terminals of both the second diode and the third diode and having a second terminal coupled to ground; and wherein the filter module comprises:
a second capacitor, having a first terminal coupled to ground and a second terminal coupled to negative terminals of both the second diode and the third diode;
a third capacitor, having a first terminal coupled to the second terminal of the second capacitor and a second terminal coupled to ground;
a first resistor, coupled to the third capacitor in parallel; and
a second resistor, coupled to the first resistor in parallel.

12. The light device driving system of claim 11, wherein the transformer module further comprises:
a fourth diode, having a positive terminal coupled to a third input terminal of the first inductor;
a fourth capacitor, having a first terminal coupled to ground and a second terminal coupled to a fourth input terminal of the first inductor;
a fifth capacitor, having a first terminal coupled to the second terminal of the fourth capacitor;
a third resistor, coupled to the fifth capacitor in parallel;
a fourth resistor, coupled to the third resistor in parallel;
a fifth resistor, having a first terminal coupled to a negative terminal of the fourth diode and a second terminal coupled to a second terminal of the fifth capacitor;
a sixth capacitor, having a first terminal coupled to the first input terminal of the first inductor and a second terminal coupled to the second input terminal of the first inductor;
a sixth resistor, having a first terminal coupled to the second terminal of the sixth capacitor;
a fifth diode, having a positive terminal coupled to a second terminal of the sixth resistor and a negative terminal coupled to an emitter of the bipolar transistor;
a seventh capacitor, having a first terminal coupled to the emitter of the bipolar transistor and a second terminal coupled to the first terminal of the sixth capacitor and the positive terminal of the first diode;
a seventh resistor, having a first terminal coupled to the emitter of the bipolar transistor and a second terminal coupled to the gate of the bipolar transistor;
a sixth diode, having a positive terminal coupled to a gate of the p-type MOSFET and having a negative terminal coupled to the duty cycle adjusting module;
an eighth resistor, having a first terminal coupled to the positive terminal of the sixth diode and a second terminal coupled to a drain of the p-type MOSFET;
a ninth resistor, having a first terminal coupled to the positive terminal of the sixth diode; and
a tenth resistor, having a first terminal coupled to the negative terminal of the sixth diode and a second terminal coupled to a second terminal of the seventh resistor;

wherein the rectifier module further comprises:
an eighth capacitor, having a first terminal coupled to the positive terminals of the second diode and the third diode; and
an eleventh resistor, having a first terminal coupled to a second terminal of the eighth capacitor and a second terminal coupled to the negative terminals of the second diode and the third diode.

13. The light device driving system of claim 1, wherein the duty cycle adjusting module comprises:
a first capacitor, having a first terminal coupled to ground and a second terminal coupled to the voltage/current output control module for receiving the voltage feedback signal;
a second capacitor, having a first terminal coupled to the second terminal of the first capacitor;
a first resistor, having a first terminal coupled to a second terminal of the second capacitor; and
a first diode, having a negative terminal coupled to a second terminal of the first resistor; and wherein the control integrated circuit has a first input terminal coupled to the second terminal of the first capacitor, a second input terminal coupled to the second terminal of the second capacitor, and a first output terminal and a second output terminal coupled to the power outputting module for forwarding the phase-width modulation signal.

14. The light device driving system of claim 1, wherein the voltage/current output control module comprises:
an integrated circuit, having a first input terminal coupled to an upper threshold voltage, a second input terminal coupled to a lower threshold voltage, and a ground terminal coupled to ground;
a diode, having a positive terminal coupled to the duty cycle adjusting module and a positive input terminal of a signal feedback module that is configured to forward the voltage feedback signal to the duty cycle adjusting module, and having a negative terminal coupled to an output terminal of the integrated circuit;
a first resistor, having a first terminal coupled to the second input terminal of the integrated circuit and a second terminal coupled to a second input terminal of the signal feedback module;
a first capacitor, having a first terminal coupled to a first intermediate terminal of the integrated circuit;
a second resistor, having a first terminal coupled to a second terminal of the first capacitor and a second terminal coupled to the negative terminal of the diode;
a second capacitor, having a first terminal coupled to the ground terminal of the integrated circuit;
a third resistor, having a first terminal coupled a second terminal of the second capacitor; and
a third capacitor, having a first terminal coupled to a second terminal of the third resistor and a second terminal coupled to ground.

15. A light device driving system, comprising:
a voltage source managing module, configured to generate an input voltage;
a duty cycle adjusting module, configured to adjust a duty cycle of a phase-width modulation signal of the light device driving system according to a voltage feedback signal;
a control integrated circuit, configured to generate the phase-width modulation signal based on the adjusted duty cycle;
a power outputting module, configured to generate an output voltage by modulating the input voltage using the adjusted duty cycle;
a passive lighting device, configured to illuminate using the output voltage;
a current sampling module, configured to sample the output voltage to generate a result of sampling the output voltage;
a voltage dimmer, configured to generate a voltage dimming signal;

a threshold setting module, configured to limit a voltage level of the voltage dimming signal between an upper threshold voltage and a lower threshold voltage; and a voltage/current output control module, configured to generate the voltage feedback signal according to the result of sampling the output voltage and the voltage dimming signal, and configured to forward the voltage feedback signal to the duty cycle adjusting module, wherein the voltage dimmer comprises:

a first bipolar transistor having a base terminal coupled to ground and a collector terminal coupled to a positive terminal of a standard dimmer voltage source;

a second bipolar transistor having a base terminal coupled to a transmitter terminal of the first bipolar transistor, a collector terminal coupled to the base terminal of the first bipolar transistor, and a transmitter terminal coupled to the base terminal of the second bipolar transistor and an upper threshold voltage;

a first diode, having a negative side coupled to a standard dimmer voltage source and having a positive side coupled to ground;

a comparator, having an upper threshold terminal coupled to the upper threshold voltage, a lower threshold terminal coupled to ground, a positive input terminal coupled to the negative terminal of the first diode, a negative input side coupled to the positive terminal of the first diode and a lower threshold voltage, and an output side coupled to the negative input terminal of the comparator; and a second diode, having a negative terminal coupled to the negative input terminal of the comparator and a positive terminal coupled to ground; and wherein the threshold setting module comprises:

a first resistor, having a first side coupled to the upper threshold voltage and a second side coupled to the lower threshold voltage; and a second resistor, having a first side coupled to the second side of the first resistor and a second side coupled to the negative side of the second diode.

16. The light device driving system of claim 15, wherein the voltage dimmer further comprises:

a third resistor having a first terminal coupled to ground and a second terminal coupled to the base terminal of the first bipolar transistor;

a fourth resistor having a first terminal coupled to the base terminal of the second bipolar transistor and a second terminal coupled to the emitter terminal of the second bipolar transistor;

a fifth resistor coupled to the first diode in parallel;

a sixth resistor having a first terminal coupled to the upper threshold voltage;

a seventh resistor having a first terminal coupled to a second terminal of the sixth resistor and a second terminal coupled to the positive terminal of the first diode;

an eighth resistor having a first terminal coupled to the second terminal of the sixth resistor and a second terminal coupled to the negative terminal of the second diode;

a ninth resistor having a first terminal coupled to the output terminal of the comparator and a second terminal coupled to the negative terminal of the second diode;

a tenth resistor having a first terminal coupled to the negative input terminal of the comparator and the output terminal of the comparator;

an eleventh resistor having a first terminal coupled to the negative terminal of the second diode;

a twelfth resistor having a first terminal coupled to a second terminal of the eleventh resistor and a second terminal coupled to the positive terminal of the second diode;

a thirteenth resistor having a first terminal coupled to the standard dimmer voltage source and a second terminal coupled to the collector terminal of the first bipolar transistor;

a fourteenth resistor having a first terminal coupled to the collector terminal of the first bipolar transistor and a second terminal coupled to the positive input terminal of the comparator;

a first capacitor coupled to the first diode in parallel; and a second capacitor having a first terminal coupled to the negative input terminal of the comparator and a second terminal coupled to the output terminal of the comparator; and wherein the threshold setting module further comprises:

a fifteenth resistor having a first terminal coupled to the lower threshold voltage and a second terminal coupled to the second terminal of the first resistor;

a sixteenth resistor having a first terminal coupled to the second terminal of the first resistor and a second terminal coupled to ground;

a third capacitor having a first terminal coupled to the upper threshold voltage and a second terminal coupled to the first terminal of the first resistor; and a fourth capacitor coupled to the sixteenth resistor in parallel.

17. The light device driving system of claim 15, wherein the duty cycle adjusting module comprises:

a first capacitor, having a first terminal coupled to ground and a second terminal coupled to the voltage/current output control module for receiving the voltage feedback signal;

a second capacitor, having a first terminal coupled to the second terminal of the first capacitor;

a first resistor, having a first terminal coupled to a second terminal of the second capacitor; and a first diode, having a negative terminal coupled to a second terminal of the first resistor; and wherein the control integrated circuit has a first input terminal coupled to the second terminal of the first capacitor, a second input terminal coupled to the second terminal of the second capacitor, and a first output terminal and a second output terminal coupled to the power outputting module for forwarding the phase-width modulation signal.

* * * * *